US006901667B2

(12) United States Patent
Proulx

(10) Patent No.: US 6,901,667 B2
(45) Date of Patent: Jun. 7, 2005

(54) TRIMMER HEAD FOR USE IN FLEXIBLE LINE ROTARY TRIMMERS

(75) Inventor: Richard A. Proulx, Alta Loma, CA (US)

(73) Assignee: Proulx Manufacturing, Inc., Rancho Cucamonga, CA (US)

( * ) Notice: Subject to any disclaimer, the term of this patent is extended or adjusted under 35 U.S.C. 154(b) by 14 days.

(21) Appl. No.: 10/677,700

(22) Filed: Oct. 2, 2003

(65) Prior Publication Data

US 2005/0072007 A1 Apr. 7, 2005

(51) Int. Cl.[7] .......................................... A01D 34/416
(52) U.S. Cl. ......................................... 30/276; 30/347
(58) Field of Search ................... 30/276, 347; 56/12.7, 56/295

(56) References Cited

U.S. PATENT DOCUMENTS

| | | | |
|---|---|---|---|
| 4,097,991 A * | 7/1978 | Proulx .......................... | 30/276 |
| 4,145,809 A * | 3/1979 | Proulx .......................... | 30/276 |
| 4,203,212 A | 5/1980 | Proulx .......................... | 30/276 |
| 4,259,782 A | 4/1981 | Proulx .......................... | 30/276 |
| 4,458,419 A | 7/1984 | Proulx .......................... | 30/276 |
| 4,571,831 A * | 2/1986 | White, III .................... | 30/276 |
| 4,959,904 A | 10/1990 | Proulx .......................... | 30/276 |
| 5,659,960 A * | 8/1997 | Everts et al. ................. | 30/276 |
| 6,735,874 B2 * | 5/2004 | Iacona .......................... | 30/276 |

\* cited by examiner

Primary Examiner—Hwei-Siu Payer
(74) Attorney, Agent, or Firm—Holland & Knight LLP

(57) ABSTRACT

An improved flexible line rotary trimmer head of the type adapted to be bumped against the ground to effect payout of predetermined lengths of cutting line and which is secured to the trimmer by a drive bolt having a non-circular head portion and a depending shaft portion. The trimmer head housing defines a tubular portion depending axially from the upper housing surface and having a particularly configured upper portion disposed about and creating an interference fit with the head portion of said drive bolt and a lower portion particularly configured to create an interference fit with the head portion of the cam member of the line feeding assembly. A slidable push retainer is carried by the shaft portion of the drive bolt adjacent the line feeding assembly for securing the assembly to the shaft portion of the drive bolt.

32 Claims, 6 Drawing Sheets

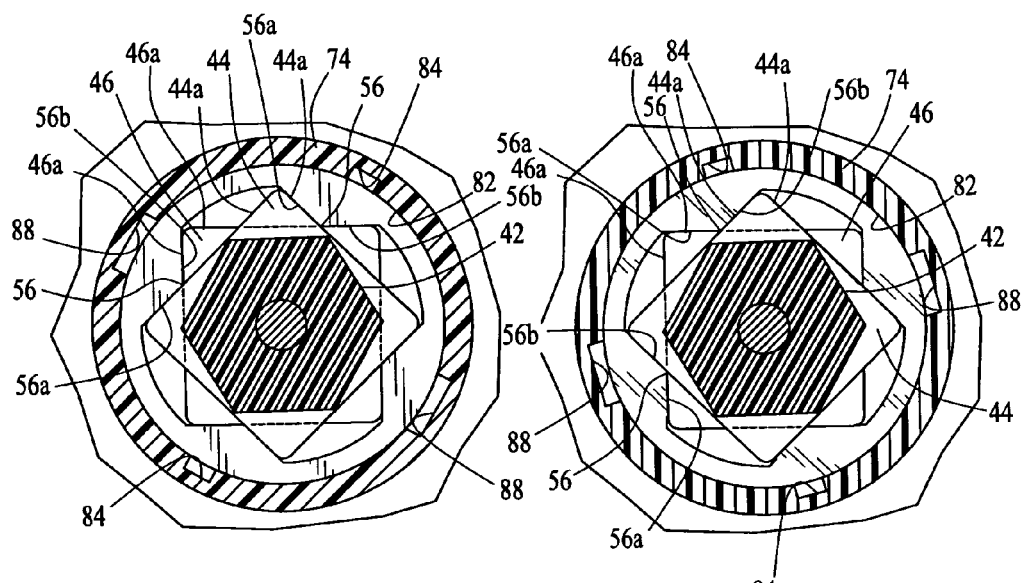
*fig. 6*  *fig. 7*
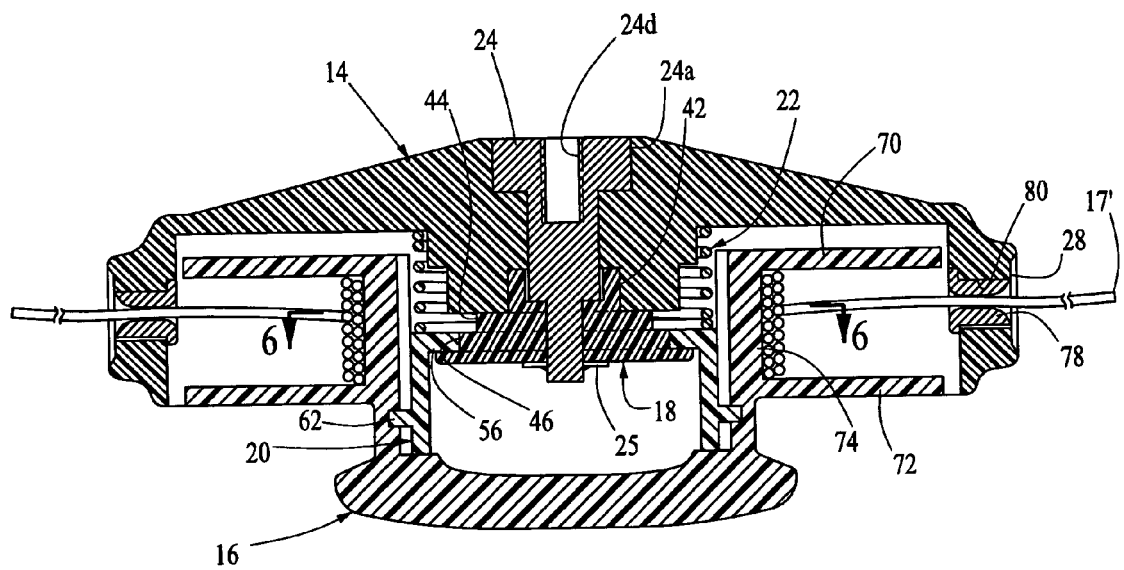
*fig. 8*

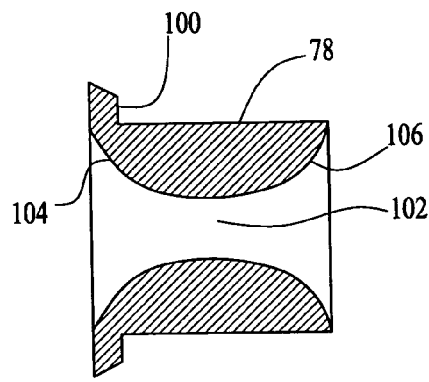
fig.9
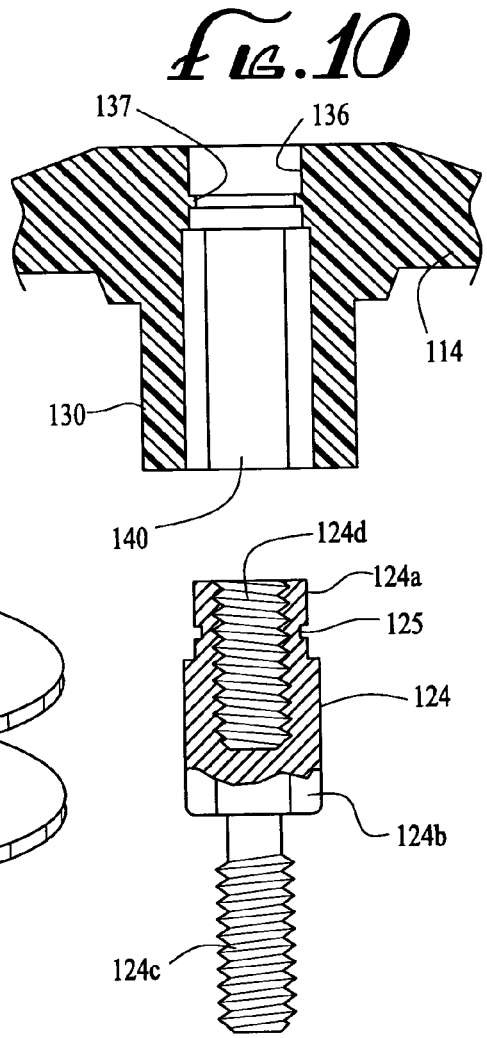
fig.10
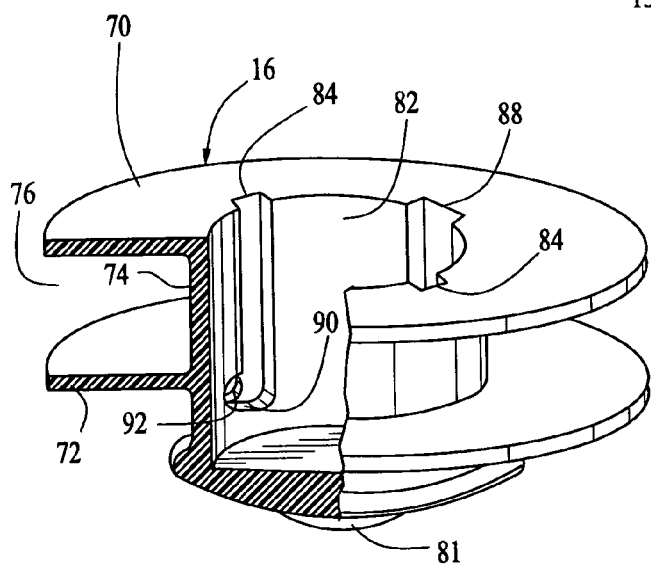
fig.12
fig.11

TRIMMER HEAD FOR USE IN FLEXIBLE LINE ROTARY TRIMMERS

BACKGROUND OF THE INVENTION

Field of the Invention

The present invention relates to an improved "bump-feed" type trimmer head for use in flexible line rotary trimming devices used to trim grass, weeds and other vegetation. More particularly, the invention is directed to an improvement in a head covered by U.S. Pat. No. 4,458,419 entitled "Simplified Flail Feedout Mechanism for A Rotary Mower," issued on Jul. 10, 1984, the contents of which are hereby incorporated by reference as though fully set forth below.

Trimmer heads used in flexible line rotary trimmers generally carry one or two lengths of flexible nylon cutting line wrapped about an interior spool with the ends of the line or lines projecting outwardly through opposed apertures in the side wall of the trimmer head. The head is threadably mounted on the end of an elongated shaft and rotated at a high velocity by a gas or electric motor so that the ends of the cutting line project radially from the head and sever weeds or other vegetation. Bump-feed heads include a line feed-out mechanism which responds to a bump on the ground intentionally applied by the operator to feed out a measured length of fresh cutting line which is typically cut to the desired length by a knife blade projecting from a shield attached to the trimmer above the cutting head and spaced a predetermined distance from the perimeter of the trimmer head housing.

The early bump feed mechanisms typically consisted of a dog or friction clutch located between the spool of line and the surrounding housing. By bumping an extension of the spool on the ground, or other fixed object, the friction clutch was temporarily disengaged for a length of time dependant on the duration of the bump. The dog clutch released by the bump then abruptly engaged at the next opportunity to feed out line in segment lengths which were related to the engagement points of the dog clutch. Such dog clutches had outwardly extending ribs which engaged inwardly extending abutment tangs and therefore depended upon a skillful bump when it was desired to deliver only one segment length. However, friction within such devices and overzealous bumping often resulted in two or more line segments being fed out, particularly especially when the device has been in use and the corners on the ribs and tangs became worn such that positive engagement was no longer assured. The unavoidable abrupt operation of the dog clutch caused such wear to occur.

A bump-feed-out mechanism was subsequently developed that automatically fed out a predetermined length of line with each bump, regardless of the duration of the bump, and which did not lose this ability with extended use. That device is disclosed in and is the subject of the incorporated reference, U.S. Pat. No. 4,458,419. As described therein in detail, the improved trimmer head contained a spool holding one or more coils of cutting line and a simplified mechanism that selectively allowed relative movement of the spool with respect to the housing in response to bumping of the head on the ground to pay out measured lengths of line. The simplified pay-out mechanism included a novel spring-loaded cam and cam follower arrangement in which the cam follower included two pair of diametrically opposed and generally inwardly facing abutment surfaces arrayed about the axis of rotation of the trimmer housing. The abutment surfaces were thus spaced 90° apart and were carried by a depending cylindrical wall that circumscribed an interior chamber. The cam member was disposed within the chamber in threaded engagement with the extended lower end of the drive bolt of the trimmer housing and defined two vertically adjacent cams, each cam being of a square configuration and defining four perpendicularly disposed cam surfaces adapted to engage the abutment surfaces on the cam follower. The upper cam was rotationally offset 45° from the lower cam.

In operation, the housing was rotationally driven by the drive bolt through a connection between the upper end of the bolt and the trimmer drive means. The housing and cam member was thus driven by the drive bolt, which in turn drove the cam follower and the spool mounted thereon due to the engagement between the cam surfaces on the cam member and the abutment surfaces on the cam follower. The line carrying spool was disposed about the cylindrical wall of the cam follower and attached thereto via a pair of opposed outwardly projecting studs on the cam follower member that extend into slots formed in the inner portion of the spool. The spool was provided with a bumper at its lower end such that when the bumper was pressed against or bumped on the ground, the housing moved downwardly with respect to the spool against the force of a spring, disengaged the lower cam from the abutment surfaces on the cam follower and allowed the cam member to rotate 45° relative to the cam follower, whereupon the cam surfaces of the upper cam would abut the abutment surfaces on the cam follower. That imparted a similar degree of relative rotation between the spool and the housing. Once the force of the bump was dissipated, the spring loading forced the spool and housing back to their relative positions, which released the cam surfaces on the upper cam from the cam follower abutment surfaces and allowed another 45° of relative rotation of the cam member and cam follower and thus of the spool and housing, for a total of 90° of rotation per bump, which provided the predetermined relative rotation between the housing and spool needed to pay out a desired length of line through the apertures in the trimmer housing. Since the cams interacted with simple, inwardly facing cam follower surfaces formed only on a single level, the release mechanism was deemed relatively economical to manufacture and, due to the large abutment surface areas presented between the cams and cam follower, the device was durable, trouble free and reliable.

Over the years, however, with increasing competition from offshore manufacturers, it became clear that the above-identified assembly was not as economical to manufacture as originally believed. It contained several parts, some of which had to be hand assembled. In addition, vibration, the threaded engagement between the cam member and the drive bolt, and the heat generated by the trimmer required the use of a chemical bonding agent having a high melting point to prevent the cam member and cam follower from breaking loose from the drive bolt. Such agents, however, had extremely high break way torques, rendering the threaded connection effectively permanent. As a result, certain components of the head could not be replaced when worn. The bump-feed head of the present invention retains all of the advantages of the above-described bump-feed trimmer head, utilizes less components parts and obviates the need for any hand assembly and the use of chemical bonding agents.

SUMMARY OF THE PRESENT INVENTION

Briefly, the present invention comprises an improved bump-feed-type rotary trimmer head including a housing defining a depending axially disposed tubular extension adapted to receive the drive bolt therein and shaped so as to define a first interference fit with the drive bolt and a second interference fit with a cam member such that rotation of the drive bolt effects corresponding rotation of the housing and cam member. The cam member defines a pair of vertically adjacent cams, square in cross-section such that each cam defines four perpendicularly disposed cam surfaces, the upper of said cams being rotationally offset 45° with respect to the lower of the two cams. A generally cylindrical cam follower defining two pair of diametrically opposed and inwardly facing cam abutment surfaces arrayed about the central axis of the housing channel is disposed about the cam member. The abutment surfaces are spaced 90° apart in a common horizontal plane and are carried by a cylindrical wall of the cam follower that extends about the cam follower. A coil spring urges the cam follower downwardly against the cam member and a slidably disposed fastener engages the extended lower end of the drive bolt adjacent the lower end of the cam member such that the cam member is vertically moveable against the force of the coil spring relative to the cam follower between a first position in which the cam surfaces on the lower cam are in planar alignment with the abutment surfaces on the cam follower and a second position in which the cam surfaces on the upper cam are in planar alignment with the abutment surfaces of the cam follower.

To facilitate loading the head with cutting line, two perpendicularly disposed opposed pairs of spool engagement lugs project from the cylindrical wall of the cam follower that are adapted to be selectively and releasably secured in corresponding pairs of diametrically opposed slots formed in the inner spool wall. Such a configuration allows the user to easily orient the spool relative to the housing such that the ends of the cutting line projecting radially from the spool are proximate the two exit apertures in the housing.

In operation, the cam surfaces of the upper and lower cams formed by the cam member and the abutment surfaces on the cam follower function as described above with reference to the previously patented structure so as to effect a 45° rotation of the cam relative to the cam follower upon the head being bumped upon the ground and a subsequent 45° rotation upon being released from the ground so as to effect 90° of relative rotation between the spool and the housing and the paying out of predetermined lengths of fresh cutting line with each bump of the head upon the ground, regardless of the duration of the bump. The cooperation of the cam surfaces and abutment surfaces continue to provide durable, trouble-free and reliable operation while the novel configuration of the trimmer housing with its cooperation and engagement with the cam member allows the components to be assembled in a totally automated process and without the need for chemical bonding agents so as to provide an improved bump-feed trimmer head at a reduced cost.

BRIEF DESCRIPTION OF THE DRAWINGS

FIG. 6 is a top view showing the relative positioning of the cam member and cam follower in their normal operating position.

FIG. 7 is a top view showing the relative positioning of the cam member and cam follower in the line feeding position.

FIG. 8 is a cross-sectional view of the trimmer head of the present invention.

FIG. 9 is a cross-sectional view of one of the eyelets used in the trimmer head of the present invention.

FIG. 10 is a cross-sectional view of an alternate embodiment of the housing portion of the trimmer head of the present invention.

FIG. 11 is a side view of a drive bolt used with an alternate embodiment of the trimmer head of the present invention.

FIG. 12 is a perspective view of the spool used in the trimmer head of the present invention with a portion of the spool broken away to illustrate the configuration of one of the locking channels therein.

DETAILED DESCRIPTION OF THE PREFERRED EMBODIMENTS

Figure 1:
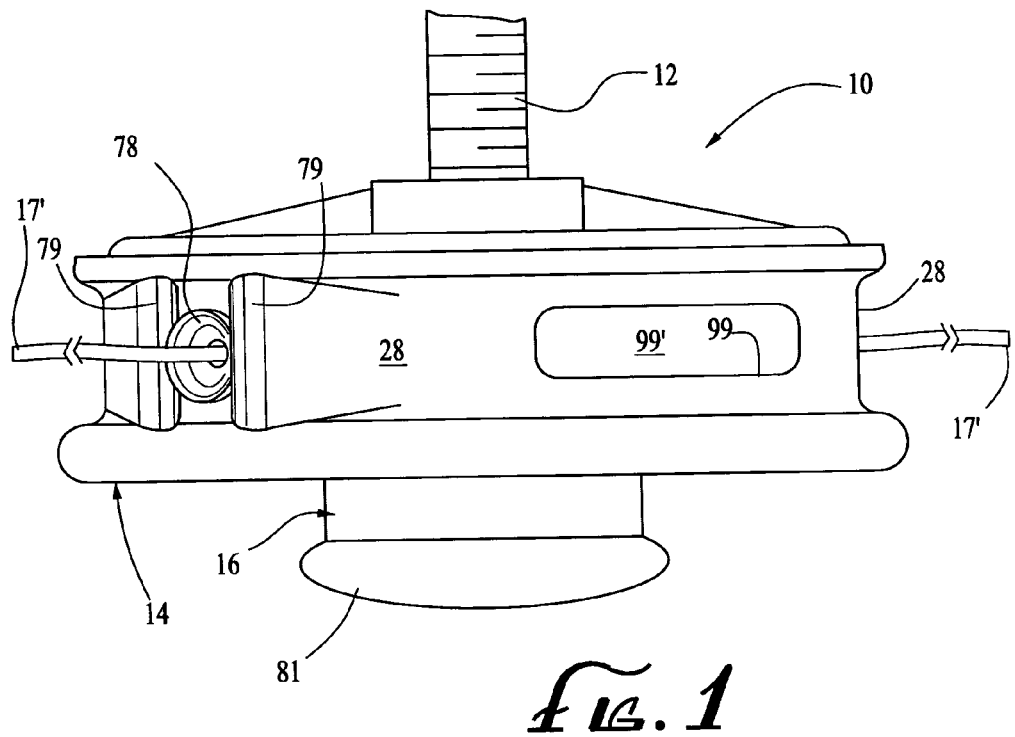
FIG. 1 is a perspective view of the trimmer head of the present invention shown secured to the drive bolt of a rotary trimmer.
Figure 3:
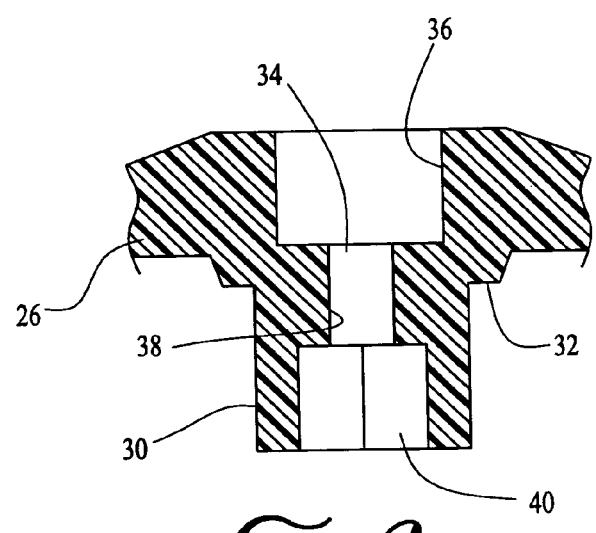
FIG. 3 is a cross-sectional view of the trimmer head housing of the present invention taken along line 3—3 of FIG. 2.
Figure 2:
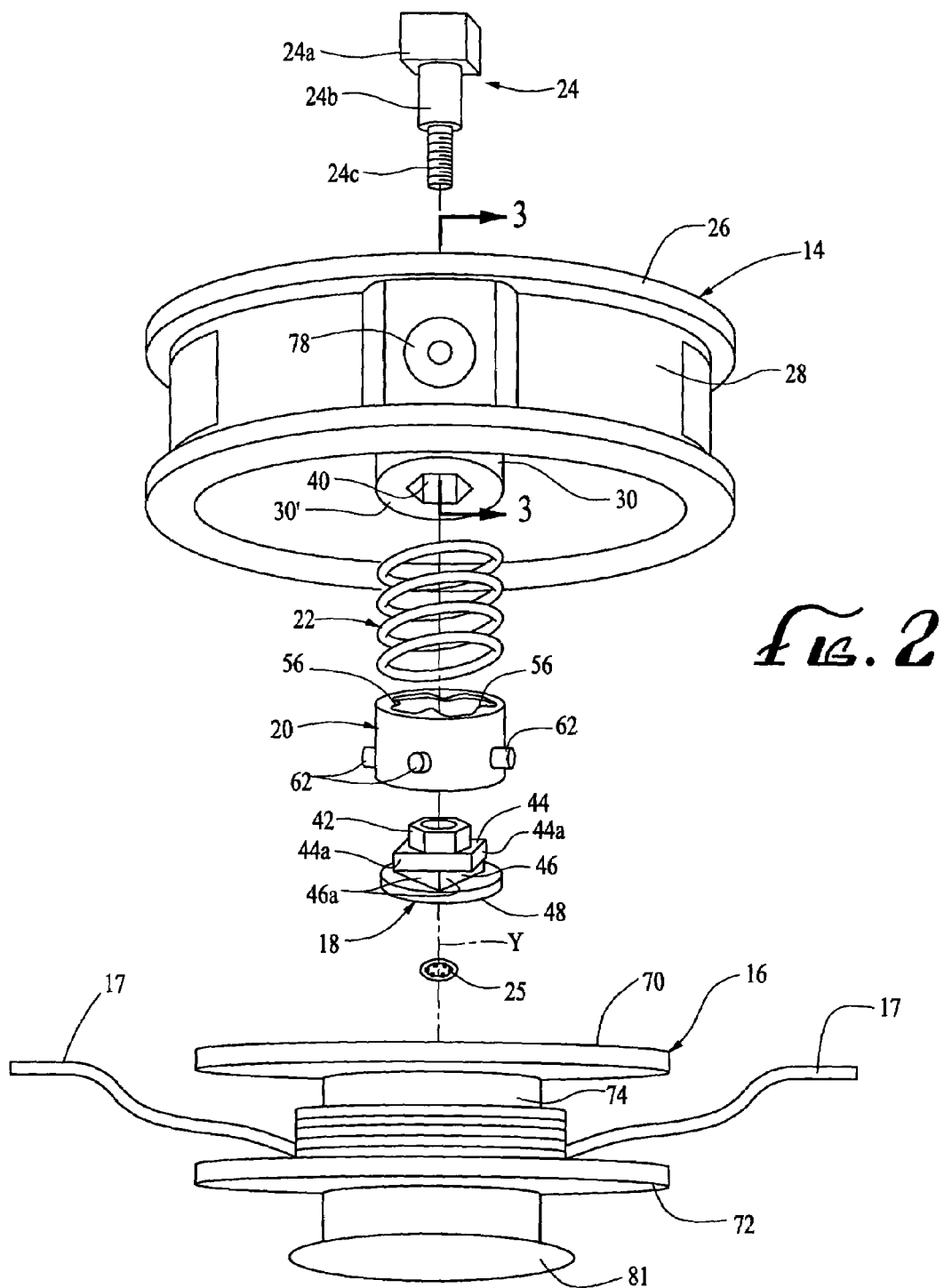
FIG. 2 is an exploded perspective view of the various elements comprising the trimmer head of the present invention.

Referring now in detail to the drawings, the trimmer head 10 of the present invention is shown in FIG. 1 mounted on the extended end of a rotatable drive shaft 12 on a gasoline or electric powered rotary trimmer (not shown). The trimmer head 10 generally comprises a housing 14, a spool 16 for carrying one or more lengths of coiled monofilament nylon cutting line 17, a cam member 18, a cam follower 20, a coil spring 22, a drive bolt 24 and a retaining nut 25. The trimmer housing 14 is preferably formed by injection molding a nylon 6 copolymer and defines an upper surface 26, a cylindrical depending skirt 28 and a centrally disposed tubular extension 30 depending from upper housing surface 26 into the interior of the housing about the central axis of rotation "Y" of the head. The tubular extension 30 in the trimmer head housing 14 defines an annular outer shoulder 32 for coil spring 22 and an axial channel 34 through which the drive bolt 24 extends. Channel 34 is configured to create a mating fitment with both the drive bolt 24 and cam member 18. The upper end portion 36 of channel 32 is preferably square in cross-section; the central portion 38 is of a constant radius and the lower portion 40 is hexagonal in cross-section.

As seen in FIG. 8, the drive bolt 24 defines a square head portion 24a which is received within the correspondingly configured upper portion 36 of channel 32, a cylindrical body portion 24b that extends through the central cylindrical portion 38 of channel 32, and a lower shaft portion 24c that projects from the larger diameter body portion 24b and extends through and projects from the lower hexagonal portion 40 of channel 32. The drive bolt also defines an internally threaded cylindrical bore 24d extending axially through the head portion 24a and a substantial part of central portion 24b for threaded engagement with the drive shaft 12 of the trimmer. Thus, with the drive bolt 24 disposed in channel 34 and in threaded engagement with the drive shaft 12, rotation of the drive shaft imparts corresponding rotation to the drive bolt 24 and housing 14 due to the interference fit between the square head portion 24a of the drive bolt and the upper portion 36 of channel 32 defined by housing extension 30.

It should be noted that the head portion of the drive bolt and the cross-section of the upper portion of the axially depending tubular member could be formed of shapes other than square to form the desired interference fit. For example, they could both be hexagonally shaped and rotation of the drive bolt would still be imparted to the trimmer head.

The cam member 18 is preferably molded of nylon 6 glass reinforced material, is of single-piece construction and, in the preferred embodiment, defines a hexagonally-shaped head portion 42, an upper cam 44, a lower cam 46 and a lower disk portion 48. Head portion 42 is sized and shaped so as to be received within the lower portion 40 of channel 32 in extension 30 such that rotation of the housing 14 will impart corresponding rotation to the cam member 18. In the preferred embodiment, the head portion 42 of the cam member 18 and the cross-section of the lower portion 40 of channel 32 are hexagonal. It is to be understood, however, that other non-circular shapes (e.g. square) could be used to provide the desired interference fit between the tubular extension 30 in the housing and the cam member.

Figure 13:
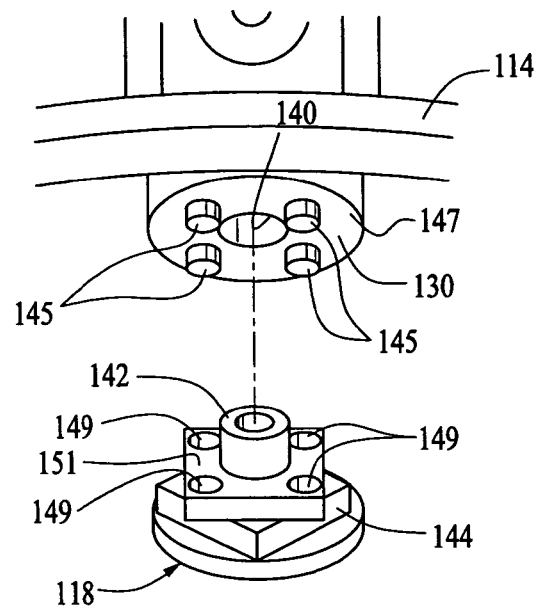
FIG. 13 is an enlarged exploded view of portions of an alternate embodiment of the present invention.
Figure 14:
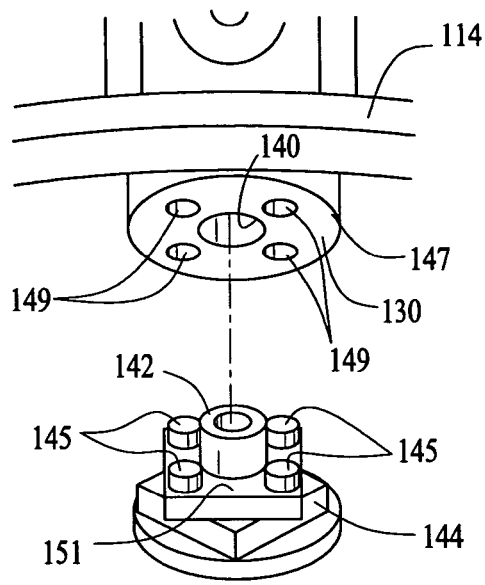
FIG. 14 is an enlarged exploded view of an alternate embodiment of the present invention similar to that shown in FIG. 13 but with the elements creating the interference fit between the housing and the cam member being reversed.
Figure 15:
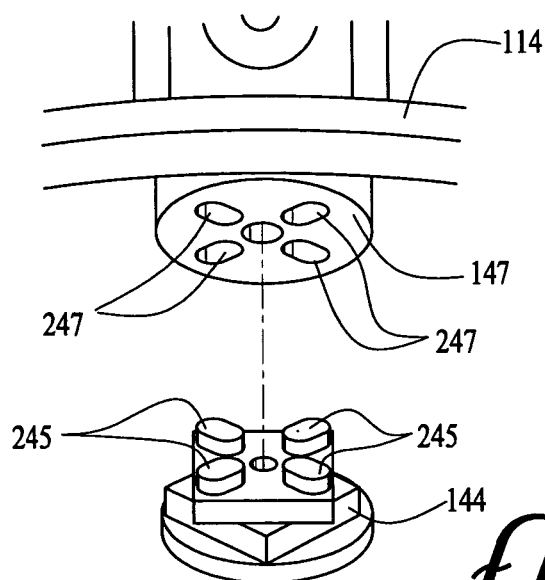
FIG. 15 is an enlarged partial exploded view of yet another alternate embodiment of the present invention.

In an alternative embodiment, the head portion 142 of cam member 118 and the cross-section of the lower portion 140 of the tubular extension 130 in the housing 114 is cylindrical and the interference fit between the housing and the cam member is provided by means of a plurality of ribs or lugs 145 projecting vertically from the extended end 147 of the tubular extension 130 and a corresponding plurality of receiving slots or apertures 149 formed in upper surface 151 of cam 144 as seen in FIG. 13. While at least one complimentary pair of ribs and slots or lugs and apertures would be required to prevent relative rotational movement between the housing and cam member, a greater number is preferable and, from a manufacturing and operational standpoint, four equally spaced pairs of ribs and slots or lugs and apertures would appear to be ideal. Such a configuration is illustrated in FIG. 13. It is to be understood that the male element of such an interference fit (e.g., rib or lug) could be provided on either the extended end 147 of the tubular housing extension 130 as shown in FIG. 13 or on the upper surface 151 of the cam 144. In either case, and the corresponding female elements (e.g., slot or aperture) would be provided in the other component. Such a reversal of parts is shown in FIG. 14. In yet another alternative embodiment, the head portion of the cam member could be eliminated altogether and the required interference fit provided by the same or similar plurality of ribs or lugs 245 and receiving slots or apertures 247. Such a variation is illustrated in FIG. 15. Again, the corresponding male and female elements could be reversed.

Figure 4A:
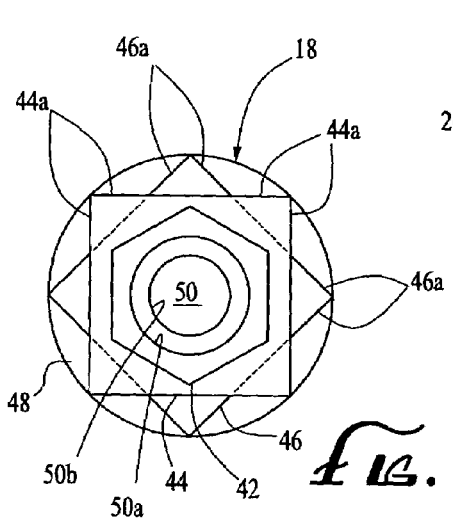
FIG. 4A is a top view of the cam member of the present invention.

The upper and lower cams 44 and 46 are preferably each of a square configuration so as to each define four identical cam surfaces, 44a and 46a respectively. Each of the cam surfaces in each cam is parallel to the axis of rotation Y of the head and is oriented at 90° with respect to its two adjacent cam surfaces. The upper cam 44 is rotationally offset 45° from the lower cam 46 as seen, for example, in FIG. 4A. Cam member 18 further defines an axially disposed channel 50 extending vertically therethrough. Channel 50 has a first upper constant radius portion 50a adapted to receive the first constant radius portion 24b of drive bolt 24 and a second smaller diameter constant radius portion 50b adapted to receive in a slip fit the second and smaller constant radius portion 24c of drive bolt 24, which extends therethrough.

Figure 5A:
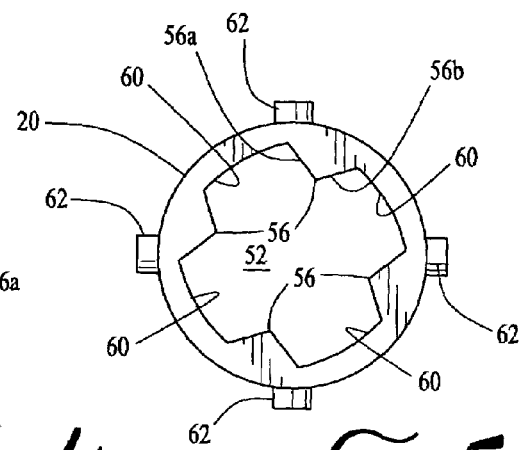
FIG. 5A is a top view of the cam follower member of the present invention.
Figure 4B:
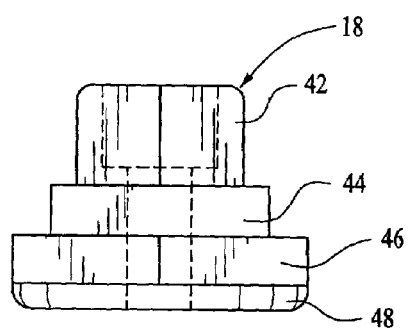
FIG. 4B is a side view of the cam member of the present invention.
Figure 5B:
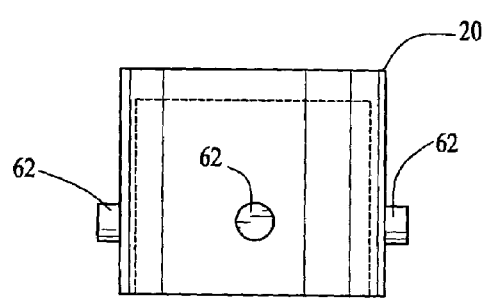
FIG. 5B is a side view of the cam follower member of the present invention.

The cam member 18 is disposed within trimmer head 10 interiorly of the cam follower 20, the configuration which is best seen in FIGS. 5A and 5B. The cam follower is preferably molded of the same material as cam member 18, is of single-piece construction and defines a cylindrical wall portion 52 circumscribing a chamber 54 and four equiangularly disposed projections 56 extending radially inwardly of chamber 54 from the upper interior end portions of cylindrical wall 52. Each of projections 56 defines a pair of angularly disposed cam abutment surfaces 56a and 56b and relief areas 60 disposed therebetween. The abutment surfaces 56a and 56b on each projection extend parallel to the axis of rotation Y of the cutting heat and are angled at 135° with respect to each other. Four outwardly projecting radial lugs 62 are equiangularly disposed about the cylindrical wall portion 52 of the cam follower 20 for the releasable securement of the spool 16 to the cam follower, as will be described.

The spool 16 defines an upper annular flange 70 and a lower annular flange 72 carried by a hollow cylindrical body portion 74 so as to define an annular area 76 between flanges 72 and 74 for carrying coils of flexible nylon cutting line 17 wrapped about body portion 74 such that upon assembly, the end portions 17' of the cutting line extend outwardly through eyelets 78 which are press fit through opposed apertures 80 in the sidewall of the head formed by housing skirt 28. In the preferred head configuration shown in FIG. 1, the portions of the housing skirt 28 adjacent the eyelets 78 are raised or ramped radially outwardly to protect the eyelets during use from foreign objects.

The body portion 74 of spool 16 further defines a rounded bumper 81 at its lower end, an interior cylindrical chamber 82, a pair of diametrically opposed and identically configured vertical locking channels 84 in the interior side wall thereof and a pair of diametrically opposed and identically configured vertical guide channels 88 transversely aligned with respect to locking channels 84. As seen in FIG. 12, locking channels 84 terminate at their lower ends in somewhat shallower offset portions 90 that terminate in a pair of opposed securement apertures 92 extending through the cylindrical body portion 74. The locking and guide channels are each adapted to slidably receive one of the outward projecting radial lugs 62 on the cam follower 20. The guide channels 88 differ from locking channels 84 in that they are wider, of a constant length and do not terminate in apertures. The guide channels preferably have a width equal to the width of the locking channels plus the length of the offset portions 90 of the locking channels 84.

The spool 16 is secured to the cam follower 20 upon aligning the lugs 62 with the locking and guide channels 84 and 88 such that the end portions 17' the cutting line 17 project radially from the spool 16 proximate eyelets 78, the spool is pressed over the cam follower until the lugs 62 reach the lower ends of the guide and locking channels. The spool is then rotated such that the lugs in the two locking channels 84 pass into the slightly shallower offset portions 90 thereof, slightly compressing the cam follower until the two lugs reach the apertures 92 whereupon the resiliency in the cam follower material causes the lugs to snap into apertures 92, securing the spool to the cam follower. In the locked position, the two lugs in apertures 92 are disposed adjacent the aperture walls and the two lugs in the guide channels 88 are adjacent the leading walls of the channels such that during use, all four lugs will abut their adjacent walls to effect corresponding rotation of the spool 16 with the cam follower 20.

To remove the spool, one need only twist the spool relative to the cam follower and when the lugs are pulled back into the vertical portion of the locking channels, the spool can be easily axially withdrawn from the housing. By providing four vertical channels in the spool and four lugs on the cam follower, each spaced 90° apart, the spool 16 can be easily secured in place over the cam follower such that the end portions of the cutting line are proximate eyelets 78 and thus readily aligned with the eyelets 78, facilitating the loading of the line carrying spool onto the housing. In addition, the driving force is evenly distributed among the four lugs 62 on the cam follower 20. Guide channels 88 are provided in lieu of a second pair of locking channels 84 for mold forming purposes only. Otherwise, four identical locking channels could be employed. If desired, the two guide channels in the spool could be widened so as to each define an arcuate length of about 95° such that the spool could accommodate cam follower configurations having six equally-spaced projecting lugs. Again, the guide channels would be sized such that two of the lugs in each of the guide channels would be adjacent a leading wall of the channel such that during use, four lugs will again function as drive lugs to effect rotation of the spool.

Fully assembled, the cam member is located within the chamber 54 in the cam follower 20 with its hexagonally-shaped head portion 42 disposed within the correspondingly configured portion 40 of channel 34 defined by the housing tubular extension 30. The coil spring 22 is disposed between and bears against the shoulder 32 formed by the housing extension 30 and the upper surface of the cam follower 20 defined by cylindrical wall 52 and projections 56, urging the cam follower 20 downwardly about the cam member 18 such that the undersides of projections 56 on the cam follower about the upper surface of the disk portion 48 of the cam member. A 5/16-inch or other suitably sized push-type retainer or pal nut 25 (also referred to as a push nut or bolt retainer) is slid onto the cylindrical lower end of the shaft portion 24c of the drive bolt 24 snugly against the underside of disk 48 on the cam member 18. The shaft portion 24c of the drive bolt can be threaded or smooth and push-type retainers, such as those shown and described in the 2003 edition of the *McMaster-Carr Catalog* at page 2982, are available for threaded as well as unthreaded bolts. By providing the shaft portion 24c of the drive bolt with threads, a conventional threaded hex nut could be used for repairs in the field, if necessary, and if a push-type retainer were not available. The use of a push-type retainer, however, allows for simple and totally automated assembly of trimmer head 10 which is an object of the present invention.

The spool 16 is disposed within the interior of housing 14 with two of the lugs 62 thereon being disposed in the offset portion of locking channels 82 projecting through apertures 92 and the remaining two lugs being disposed at the bottom of the two guide channels 88. The bumper 84 on the bottom of spool 16 projects downwardly from the lower end of the housing 14 as seen in FIG. 1 and the extended ends of the cutting line 17 project through the opposed eyelets 78 in the housing skirt 28.

The eyelets 78 preferably employed with the present invention are constructed of aircraft grade aluminum and each define annular retention flanges 100 at their inner ends and radially extending channels 102 for the passage of the cutting line therethrough. As seen in FIG. 9, the inner and outer end portions 104 and 106 of channels 102 are radiused to eliminate any sharp corners and accommodate bending of the line about the eyelets without crimping or overly stressing the line. This eyelet configuration allows the eyelets 78 to be attached to the head 10 in an automated process and be held in place by flange 100 and the centrifugal force generated thereon during use.

In operation, the rotating drive shaft 12 on the trimmer effects corresponding rotation of the housing 12 and the cam member 18 due to the fitment between the drive bolt 24, drive shaft 12 and the tubular extension 30 of housing 14. The cam follower 20 is pressed downwardly about the cam member 18 such that the undersides of projections 56 on the cam follower abut the disk portion 48 of the cam member 18 and the cam surfaces 46a on the lower cam 46 are aligned with and bear against the abutment surfaces 58a defined by the projections 56 on the cam follower 20 to effect corresponding counterclockwise rotation of the cam follower and the spool carried thereby as seen from above in FIG. 6. Upon pressing the rotating bumper 84 on the bottom of the spool 16 against the ground or other rigid surface, the trimmer housing 14 and the cam member 18 which is secured thereto by drive bolt 24 and retainer 25 are forced downwardly, compressing coil spring 22 and disengaging the lower cam 46 from the abutment surfaces 58a on the cam follower. As the cam member 18 moves downwardly until the lower end of 30' of the tubular extension 30 abuts the upper surface of the upper cam 44, the lower cam passes out of the path of engagement with the abutment surfaces on the cam follower and the cam surfaces 44a on the upper cam 44 are brought into the path of abutment surfaces 58a. This causes a slowing of the rotation of the cam follower 20 relative to the cam member 18 and thus of the spool 16 relative to the cam member 18 and housing 14. When the upper cam surfaces 44a strike the abutment surfaces 56a, corresponding rotation of the cam and cam follower resumes (see FIG. 7). However, during the interim the cam member and housing rotate 45° relative to the cam follower and spool.

Once the force of the bump is dissipated, the coil spring 22 forces the spool and housing back to their initial positions, releasing the engagement of cam surfaces 44a on the upper cam 44 from the cam follower abutment surfaces 56a, re-engaging cam surfaces 46a and allowing another 45° of relative rotation of the cam member and cam follower and thus of the spool and the housing for a total of 90° of rotation during the bump, regardless of the time duration of the bump. During these periods relative rotation in which the spool lags behind the housing, centrifugal force causes a predetermined amount of fresh cutting line to be paid out through the opposed eyelets 78 in the trimmer housing. The worn line is then severed by a conventional cutting blade (not shown) carried by a protective cover (not shown) mounted on the trimmer above and radially spaced from the rotating head 10.

It should be noted that the cam follower 20 includes relief areas 60 between projections 56 so that the cams 44 and 46 can slide vertically with respect to the cam follower 20 when the cams 44 and 46 are in the positions relative to the cam follower shown in FIGS. 6 and 7, but at no other times. In FIG. 7, the cams 44 and 46 are free to slide upwardly to disengage the cam surfaces 44a and in FIG. 6, free to slide downwardly to disengage the cam surfaces 46a. It should also be noted that the operation of trimmer head 10 has been discussed above with the cam surfaces 46a and 44a alternately engaging the cam engagement surfaces 56a on the cam follower 20. This is the case when the trimmer drives the head in a counterclockwise direction as viewed from above. It should be noted, however, that many trimmers are designed to rotate the cutting head in the opposite direction. The head 10 can be spun in the opposite direction and the cams 44 and 46 will still provide the 90° relative rotation by interacting with the surfaces 56b on the cam follower as opposed to surfaces 56a. It also should be noted that cams having three or more cam surfaces are possible, with four-sided cams 44 and 46 being a practical comprise between the surface area contact, ease of manufacture, and the desired line feed out.

In the preferred embodiment of cutting head housing 14, a recessed area 99 is provided in the housing skirt 28 to define a "window" for a label. As the surface 99' on which the label would be affixed is offset from the remainder of the housing skirt, the label is protected during use.

An alternate embodiment of the present invention is illustrated in FIGS. 10 and 11. This embodiment differs from the prior embodiment in that the housing 114 and drive bolt 124 are of a slightly modified configuration wherein the drive bolt is pushed upwardly through the lower hexagonally-shaped portion 140 of the interior housing extension 130 for assembly. In this embodiment, the tubular extension 130 of modified housing 114 defines a cylindrical upper portion 136 having a raised annular ridge 137 extending about the interior side wall thereof and an extended hexagonally-shaped lower portion 140. The drive bolt 124 defines a cylindrical upper portion 124a having an annular groove 125 formed therein, a hexagonally-shaped mid-portion 124b and a reduced diameter cylindrical shaft portion 124c, which, as with the shaft portion 24c of drive bolt 24 can be threaded or smooth. Upon inserting drive bolt 124 into tubular extension 130, the ridge 137 in the upper portion of the bolt provide an interference fit to retain the bolt within the housing. If the bolt is pushed into place just after the housing has been formed, the nylon material will shrink about the bolt as it cools, enhancing the securement. However, even if the bolt is inserted into the housing extension long after the housing is formed and cooling, the snap fitment between the bolt and housing extension will retain the bolt in place.

The cylindrical upper portion 124a of drive bolt 124 has a threaded cylindrical bore 124d extending axially therethrough and into the hexagonal portion 124b for threaded engagement with the drive shaft 12 of the trimmer, similar to the prior embodiment. However, if desired, the bolt 124 could be provided with a threaded extension (not shown) adapted to engage a trimmer drive shaft having a threaded female end. This same change could, of course, be employed with drive bolt 24. The hexagonally-shaped portion 124b of the drive bolt is received within an upper portion of the hexagonally-shaped portion 140 of the housing extension 130 and, upon securement of the cam member 18 and cam follower 20 is disposed immediately adjacent the hexagonally-shaped head portion 42 of the cam member. As in the prior embodiment, the shaft portion 124c of drive bolt 124 projects downwardly beyond the end of the housing extension 130 and through the cam member 18 for engagement with a push retainer 93. The remainder of the elements also are identical to the corresponding elements of the prior embodiment. As with the prior embodiment, this embodiment can be assembled in a totally automated process with a minimal number of parts and without the need for chemical bonding elements which are susceptible to heat and/or prevent part replacement.

Various other changes and modifications also may be made in carrying out the present invention without departing from the spirit and scope thereof. Insofar as these changes and modifications are within the purview of the appended claims, they are to be considered as part of the present invention.

What is claimed is:

1. A trimmer head for use in flexible line rotary trimmers of the type adapted to be bumped against the ground to effect the feeding of predetermined lengths of line, said head comprising:

a housing circumscribing an interior area and defining an open-ended tubular member extending axially into said area, said tubular member defining an upper portion non-circular in cross-section and a lower portion non-circular in cross-section;

a drive bolt for securing said head to the trimmer and defining a head portion and a shaft portion, said head portion being disposed within said upper portion of said tubular member and shaped so as to create an interference fit therewith, said shaft portion projecting from said head portion through said lower portion of said tubular member in said housing;

a spool assembly having a common axis of rotation with said housing and defining a cylindrical body portion, a cutting line storage area disposed about said body portion and a bumper for engagement with the ground;

a line feeding assembly to provide outward feeding of predetermined lengths of line in response to the striking of said bumper on the ground, said line feeding assembly including a cam member having an upper head portion disposed within said lower portion of said tubular member and shaped so as to create an interference fit therewith and a pair of vertically adjacent, similarly shaped and rotationally offset first and second cams disposed below said upper head portion of said cam member, and a cam follower releasably connected to said spool assembly and defining a plurality of engagement surfaces adapted to selectively engage said cams in predetermined rotational increments in response to the striking of said bumper on the ground, whereby relative rotation is produced between said housing and said spool assembly; and a retainer carried by said shaft portion of said drive bolt adjacent said cam member for securing said cam member and said cam follower to said shaft portion of said drive bolt.

2. The trimmer head of claim 1 wherein said upper portion of said tubular member in said housing is square in cross-section and said lower portion of said tubular member is hexagonal in cross-section and wherein said cam member is of single-piece construction and said upper head portion thereof is hexagonal in cross-section.

3. The trimmer head of claim 1 wherein said retainer is slidably mounted on said shaft portion of said drive bolt.

4. The trimmer head of claim 1 wherein said housing defines an upper surface and an annular skirt depending from said surface, said skirt defining a plurality of axially-spaced apertures therein and including a corresponding plurality of eyelets slidably mounted in said apertures for the passage of line therethrough said eyelets defining radial channels extending therethrough and inner and outer end portions, said inner end portions defining radially projecting flanges thereon, said flanges abutting said skirt within said interior area of said housing upon being urged thereagainst by centrifugal force generated thereon during use so as to retain said eyelets in place on said housing while allowing for the automated radial insertion thereof through said apertures in said skirt.

5. A trimmer head for use in flexible line rotary trimmers of the type adapted to be bumped against the ground to effect the feeding of predetermined lengths of line, said head comprising:
   a housing defining an upper surface, an annular skirt depending from said surface and circumscribing an interior area, a pair of opposed apertures in said skirt, a corresponding pair of eyelets slidably mounted through said apertures for the passage of line therethrough and a tubular member extending axially from said upper surface of said housing into said area, said tubular member defining an upper portion square in cross-section and a lower portion hexagonal in cross-section;
   a drive bolt for securing said head to the trimmer, said bolt defining a head portion and a shaft portion, said head portion of said bolt defining a threaded surface for securing said head to the trimmer, is square in cross-section and is disposed within said upper portion of said tubular member, said shaft portion extending through and projecting from said lower hexagonal portion of said tubular member;
   a spool assembly having a common axis of rotation with said housing and defining a cylindrical body portion, a cutting line storage area disposed about said body portion and a bumper for engagement with the ground;
   a line feeding assembly to provide outward feeding of predetermined lengths of line in response to the striking of said bumper on the ground, said line feeding assembly including a cam member having a hexagonally-shaped upper head portion disposed within said lower portion of said tubular member of said housing and a pair of vertically adjacent, similarly shaped and rotationally offset first and second cams disposed below said upper head portion of said cam member, and a cam follower releasably connected to said spool assembly and defining a plurality of engagement surfaces adapted to selectively engage said cams in predetermined rotational increments in response to the striking of said bumper on the ground, whereby relative rotation is produced between said housing and said spool assembly; and
   a slidable push retainer carried by said shaft portion of said drive bolt adjacent said cam member for securing said cam member and said cam follower to said shaft portion of said drive bolt.

6. The trimmer head of claim 5 wherein said eyelets define radial channels extending therethrough and inner and outer end portions, said inner end portions defining radially projecting flanges thereon, said flanges abutting said skirt within said interior area of said housing upon being urged thereagainst by centrifugal force generated thereon during use so as to retain said eyelets in place on said housing while allowing for the automated radial insertion thereof through said apertures in said skirt.

7. A flexible line rotary trimmer head of the type adapted to be bumped against the ground to effect the pay-out of predetermined lengths of cutting line, said head comprising:
   a housing defining an upper surface, an annular skirt depending from said upper surface and circumscribing an interior area, a plurality of equiangularly-spaced line outlet apertures in said skirt and a tubular extension depending axially from said upper surface into said area, said tubular extension defining an upper portion square in cross-section, an intermediary portion cylindrical in cross-section and a lower portion hexagonal in cross-section;
   a drive bolt disposed within said tubular extension of said housing and defining a head portion, a body portion and a shaft portion, said head portion being disposed within and creating an interference fit with said upper portion of said tubular extension, said body portion being disposed within said intermediary portion of said tubular extension and said shaft portion projecting from said body portion of said drive bolt through said lower hexagonal portion of said tubular extension;
   a spool assembly having a common axis of rotation with said housing and defining a body portion, a cutting line storage area disposed about said body portion and a bumper for engagement with the ground;
   a line feeding assembly to provide outward feeding of predetermined lengths of line in response to the striking of said bumper on the ground, said line feeding means including a cam member having an upper head portion hexagonal in cross-section and disposed within said lower portion of said tubular extension and creating an interference fit therewith, and a pair of vertically adjacent, similarly shaped, first and second cams disposed below said upper head portion of said cam member and rotationally oriented at 45° to each other and extending radially outwardly from said axis of rotation, said first and second cams each having four outer cam surfaces meeting at about 90° and a cam follower member releasably connected to said spool assembly and defining a plurality of engagement surfaces parallel to said axis of rotation to selectively engage said cam surfaces in predetermined rotational increments in response to the striking of said bumper on the ground, whereby relative rotation is produced between said housing and spool assembly; and
   a slidable push retainer carried by said shaft portion of said drive bolt adjacent said cam member for securing said cam member and said cam follower member on said drive bolt.

8. The trimmer head of claim 7 including a plurality of eyelets carried by said skirt, one of said eyelets being disposed in each of said apertures therein for the passage of line therethrough, each of said eyelets defining a radial channel extending therethrough and inner and outer end portions, said inner end portion defining a radially projecting flange thereon, said flange abutting said skirt within said interior area of said housing upon being urged there against by centrifugal force generated thereon during use so as to retain said eyelet in place on said housing while allowing for the automated radial insertion thereof through said aperture in said skirt.

9. A trimmer head for use in flexible line rotary trimmers of the type adapted to be bumped against the ground to effect the feeding of predetermined lengths of line, said head comprising:
   a housing circumscribing an interior area and defining an open-ended tubular member extending axially into said area, said tubular member having an upper portion defining a bolt engaging surface and a lower portion defining a non-circular cross-section;
   a drive bolt for securing said head to the trimmer and defining a head portion and a shaft portion, said head portion being disposed within said upper portion of said tubular member and shaped so as to abut said bolt engaging surface thereon and create an interference fit therewith, said shaft portion projecting from said head portion through said lower portion of said tubular member in said housing;

a spool assembly having a common axis of rotation with said housing and defining a cylindrical body portion, a cutting line storage area disposed about said body portion and a bumper for engagement with the ground;

a line feeding assembly to provide outward feeding of predetermined lengths of line in response to the striking of said bumper on the ground, said line feeding assembly including a cam member having an upper head portion disposed within said lower portion of said tubular member and shaped so as to create an interference fit therewith and a pair of vertically adjacent, similarly shaped and rotationally offset first and second cams disposed below said upper head portion of said cam member, and a cam follower releasably connected to said spool assembly and defining a plurality of engagement surfaces adapted to selectively engage said cams in predetermined rotational increments in response to the striking of said bumper on the ground, whereby relative rotation is produced between said housing and said spool assembly; and a retainer carried by said shaft portion of said drive bolt adjacent said cam member for securing said cam member and said cam follower to said shaft portion of said drive bolt.

10. The trimmer head of claim 9 wherein said bolt engaging surface in the upper portion of said tubular member in said housing comprises a raised annular ridge extending about said upper portion of said tubular member, said head portion of said drive bolt defines an annular groove therein, said ridge being disposed within said groove and wherein said lower portion of said tubular member is hexagonal in cross-section and said cam member is of single-piece construction.

11. The trimmer head of claim 9 wherein said housing defines an upper surface and an annular skirt depending from said surface, said skirt defining a plurality of axially-spaced apertures therein and including a corresponding plurality of eyelets slidably mounted in said apertures for the passage of line therethrough said eyelets defining radial channels extending therethrough and inner and outer end portions, said inner end portions defining radially projecting flanges thereon, said flanges abutting said skirt within said interior area of said housing upon being urged thereagainst by centrifugal force generated thereon during use so as to retain said eyelets in place on said housing while allowing for the automated radial insertion thereof through said apertures in said skirt.

12. The trimmer head of claim 11 wherein said bolt engaging surface in the upper portion of said tubular member in said housing comprises a raised annular ridge extending about said upper portion of said tubular member, said head portion of said drive bolt defines an annular groove therein, said ridge being disposed within said groove and wherein said lower portion of said tubular member is hexagonal in cross-section and said cam member is of single-piece construction.

13. A trimmer head for use in flexible line rotary trimmers of the type adapted to be bumped against the ground to effect the feeding of predetermined lengths of line and secured to the trimmer by a drive bolt having a head portion non-circular in cross-section and a shaft portion, said head comprising:

a housing circumscribing an interior area and defining an open-ended tubular member extending axially into said area, said tubular member defining an upper portion having a non-circular cross-section and a lower portion having a non-circular cross-section, said upper portion being disposed about and creating an interference with the head portion of the drive bolt;

a spool assembly having a common axis of rotation with said housing and defining a cylindrical body portion, a cutting line storage area disposed about said body portion and a bumper for engagement with the ground;

a line feeding assembly to provide outward feeding of predetermined lengths of line in response to the striking of said bumper on the ground, said line feeding assembly including a cam member having an upper head portion disposed within said lower portion of said tubular member and shaped so as to create an interference fit therewith and a pair of vertically adjacent, similarly shaped and rotationally offset first and second cams disposed below said upper head portion of said cam member, and a cam follower releasably connected to said spool assembly and defining a plurality of engagement surfaces adapted to selectively engage said cams in predetermined rotational increments in response to the striking of said bumper on the ground, whereby relative rotation is produced between said housing and said spool assembly; and a retainer carried by said shaft portion of said drive bolt adjacent said cam member for securing said cam member and said cam follower to said shaft portion of said drive bolt.

14. The trimmer head of claim 13 wherein said upper portion of said tubular member in said housing is square in cross-section and said lower portion of said tubular member is hexagonal in cross-section and wherein said cam member is of single-piece construction, said upper head portion thereof being hexagonal in cross-section.

15. The trimmer head of claim 13 wherein said retainer is slidably mounted on said shaft portion of said drive bolt.

16. The trimmer head of claim 13 wherein said housing defines an upper surface and an annular skirt depending from said surface, said skirt defining a plurality of axially spaced apertures therein and including a corresponding plurality of eyelets slidably mounted in said apertures for the passage of line therethrough said eyelets defining radial channels extending therethrough and inner and outer end portions, said inner end portions defining radially projecting flanges thereon, said flanges abutting said skirt within said interior area of said housing upon being urged there against by centrifugal force generated thereon during use so as to retain said eyelets in place on said housing while allowing for the automated radial insertion thereof through said apertures in said skirt.

17. The trimmer head of claim 16 wherein said retainer is slidably mounted on said shaft portion of said drive bolt.

18. A trimmer head for use in flexible line rotary trimmers of the type adapted to be bumped against the ground to effect the feeding of predetermined links of line, said head comprising:

a housing circumscribing an interior area and defining an open-ended tubular member extending axially into said area, said tubular member having an upper portion defining a plurality of bolt engaging surfaces and a lower portion defining a plurality of cam engaging surfaces;

a drive bolt for securing said head to the trimmer and defining a head portion and a shaft portion, said head portion being disposed within said upper portion of said tubular member and shaped so as to abut said bolt engaging surfaces thereon and create an interference fit therewith, said shaft portion projecting from said head portion through said lower portion of said tubular member in said housing;

a spool assembly having a common axis of rotation with said housing and defining a cylindrical body portion, a cutting line storage area disposed about said body portion and a bumper for engagement with the ground;

a line feeding assembly to provide outward feeding of predetermined lengths of line in response to the striking of said bumper on the ground, said line feeding assembly including a cam member disposed adjacent said lower portion of said tubular member and defining a plurality of housing engaging surfaces thereon abutting said cam engaging surfaces and shaped so as to create an interference fit therewith, said cam member additionally defining a pair of vertically adjacent, similarly shaped and rotationally offset first and second cams, and a cam follower releasably connected to said spool assembly and defining a plurality of engagement surfaces adapted to selectively engage said cams in predetermined rotational increments in response to the striking of said bumper on the ground, whereby relative rotation is produced between said housing and said spool assembly; and a retainer carried by said shaft portion of said drive bolt adjacent said cam member for securing said cam member and said cam follower to said shaft portion of said drive bolt.

19. The trimmer head of claim 18 wherein said cam engaging surfaces are defined by a plurality of projections extending from said tubular member of said housing and wherein said housing engaging surfaces are defined by a corresponding plurality of recesses within said cam member, said recesses receiving said projections therein and creating said interference fit between said housing and said cam member.

20. The trimmer head of claim 18 wherein said cam engaging surfaces are defined by a plurality of recesses disposed within said tubular member of said housing and said housing engaging surfaces are defined by a corresponding plurality of projections extending from said cam member, said recesses receiving said projections and creating said interference fit between said housing and said cam member.

21. The trimmer head of claim 18 wherein said cam member defines a cylindrical head portion disposed within said lower portion of said tubular member of said housing and wherein said cam engaging surfaces are defined by a plurality of projections extending from said tubular member and said housing engaging surfaces are defined by a corresponding plurality of recesses within said cam member, said recesses receiving said projections therein and creating said interference fit between said housing and said cam member.

22. The trimmer head of claim 18 wherein said cam member defines a cylindrical head portion disposed within said lower portion of said tubular member of said housing and wherein said cam engaging surfaces are defined by a plurality of recesses in said tubular member and said housing engaging surfaces are defined by a corresponding plurality of projections extending from said cam member, said recesses receiving said projections therein and creating said interference fit between said housing and said cam member.

23. A cam member for use with a cam follower operatively connected to a line carrying spool in a line feeding assembly disposed within the housing of a trimmer head for flexible line rotary trimmers of the type adapted to be bumped against the ground to effect the outward feeding of predetermined lengths of line, said cam member comprising:

a head portion and a pair of vertically adjacent, similarly shaped and rotationally offset first and second cams disposed below said head portion, said head portion defining a plurality of housing engaging surfaces and being slidably disposed within the housing, said engaging surfaces creating an interference fit with the housing such that rotation of the housing is imparted to said cam member, and wherein said cams selectively engaging the cam follower in predetermined rotational increments in response to the striking of the head on the ground, whereby relative rotation is produced between the housing and the line carrying spool of the trimmer head.

24. The cam member of claim 23 wherein said head portion defines a hexagonal configuration.

25. A cam member for use with a cam follower operatively connected to a line carrying spool in a line feeding assembly disposed within the housing of a trimmer head for flexible line rotary trimmers of the type adapted to be bumped against the ground to effect the outward feeding of predetermined lengths of line, said cam member defining a central axis of rotation, being of single-piece construction and defining a pair of vertically adjacent, similarly shaped, first and second cams rotationally oriented at about 45° with respect to each other and extending radially outward from said axis of rotation, said first cam defining a plurality of housing engagement surfaces adapted to be slidably disposed adjacent portions of said housing so as to create an interference fit therebetween whereby rotation of the housing is imparted to said cam member, said first and second cams each having four outer cam surfaces meeting at about 90° to selectively engage the cam follower in predetermined rotational increments in response to the striking of said head on the ground, whereby relative rotation is produced between the housing and the line carrying spool of said trimmer head.

26. The cam member of claim 25 wherein said first cam defines a plurality of raised projections thereon, said projects defining said housing engagement surfaces.

27. The cam member of claim 25 wherein said first cam defines a plurality of walled recesses therein, said housing engagement surfaces being defined by the walls of said recesses.

28. A trimmer head for use in flexible line rotary trimmers of the type adapted to be bumped against the ground to effect the feeding of predetermined lengths of line, said head comprising:

a housing circumscribing an interior area and defining an open-ended tubular member extending axially into said area, said tubular member defining an upper portion and a lower portion;

a drive bolt for securing said head to the trimmer and defining a head portion and a shaft portion, said head portion being disposed within said upper portion of said tubular member and shaped so as to create an interference fit therewith, said shaft portion projecting from said head portion through said lower portion of said tubular member in said housing;

a spool assembly having a common axis of rotation with said housing and defining a cylindrical body portion, a cutting line storage area disposed about said body portion and a bumper for engagement with the ground;

a line feeding assembly to provide outward feeding of predetermined lengths of line in response to the striking of said bumper on the ground, said line feeding assembly including a cam member having an upper head portion, said upper head portion being shaped so as to create an interference fit with said lower portion of said tubular member, and a pair of vertically adjacent, similarly shaped and rotationally offset first and second cams disposed below said upper head portion of said cam member, and a cam follower releasably connected to said spool assembly and defining a plurality of engagement surfaces adapted to selectively engage said cams in predetermined rotational increments in response to the striking of said bumper on the ground, whereby relative rotation is produced between said housing and said spool assembly; and a retainer carried by said shaft portion of said drive bolt adjacent said cam member for securing said cam member and said cam follower to said shaft portion of said drive bolt.

29. The trimmer head of claim 28 wherein said retainer is slidably mounted on said shaft portion of said drive bolt.

30. The trimmer head of claim 28 wherein said housing defines an upper surface and an annular skirt depending from said surface, said skirt defining a plurality of axially-spaced apertures therein and including a corresponding plurality of, eyelets slidably mounted in said apertures for the passage of line therethrough said eyelets defining radial channels extending therethrough and inner and outer end portions, said inner end portions defining radially projecting flanges thereon, said flanges abutting said skirt within said interior area of said housing upon being urged thereagainst by centrifugal force generated thereon during use so as to retain said eyelets in place on said housing while allowing for the automated radial insertion thereof through said apertures in said skirt.

31. A trimmer head for use in flexible line rotary trimmers of the type adapted to be bumped against the ground to effect the feeding of predetermined lengths of line, said head comprising:

a housing circumscribing an interior area and defining a walled channel extending axially into said area, said channel defining an upper portion and a lower portion;

a drive bolt for securing said head to the trimmer, a portion of said bolt being disposed within said upper portion of said channel and shaped so as to create an interference fit therewith;

a spool assembly having a common axis of rotation with said housing and defining a cylindrical body portion, a cutting line storage area disposed about said body portion and a bumper for engagement with the ground;

a line feeding assembly to provide outward feeding of predetermined lengths of line in response to the striking of said bumper on the ground, said line feeding assembly including a cam member having an upper head portion, said upper head portion being shaped so as to create an interference fit with said lower portion of said channel, and a pair of vertically adjacent, similarly shaped and rotationally offset first and second cams disposed below said upper head portion of said cam member, and a cam follower releasably connected to said spool assembly and defining a plurality of engagement surfaces adapted to selectively engage said cams in predetermined rotational increments in response to the striking of said bumper on the ground, whereby relative rotation is produced between said housing and said spool assembly; and a retainer engaging a portion of said drive bolt for securing said cam member and said cam follower to said drive bolt.

32. The trimmer head of claim 31 wherein said retainer is slidably mounted on a portion of said drive bolt.

* * * * *